US011618046B2

(12) United States Patent
Tanner et al.

(10) Patent No.: US 11,618,046 B2
(45) Date of Patent: Apr. 4, 2023

(54) CLEANING APPARATUS INCLUDING A ROTATING SPRAY HEAD ASSEMBLY ROTATION SENSOR

(71) Applicant: Spraying Systems Co., Wheaton, IL (US)

(72) Inventors: Geoffrey A. Tanner, Geneva, IL (US); Collin A. Wicks, Bloomingdale, IL (US); Samuel W. Scully, Forest Park, IL (US); John E. Ekpenyong, Chicago, IL (US)

(73) Assignee: Spraying Systems Co., Wheaton, IL (US)

( * ) Notice: Subject to any disclaimer, the term of this patent is extended or adjusted under 35 U.S.C. 154(b) by 316 days.

(21) Appl. No.: 16/867,175

(22) Filed: May 5, 2020

(65) Prior Publication Data

US 2020/0353491 A1    Nov. 12, 2020

Related U.S. Application Data

(60) Provisional application No. 62/843,880, filed on May 6, 2019.

(51) Int. Cl.
*B05B 3/04* (2006.01)
*B05B 3/06* (2006.01)
(Continued)

(52) U.S. Cl.
CPC .......... *B05B 12/004* (2013.01); *B05B 3/0459* (2013.01); *B05B 3/06* (2013.01);
(Continued)

(58) Field of Classification Search
None
See application file for complete search history.

(56) References Cited

U.S. PATENT DOCUMENTS

| 9,302,301 B2 | 4/2016 | Bramsen |
| 2007/0119965 A1 | 5/2007 | Roney et al. |
| 2014/0069462 A1* | 3/2014 | Becker ............... A47L 15/4219 |
| | | 134/10 |

FOREIGN PATENT DOCUMENTS

| CN | 104144752 A | 11/2014 |
| EP | 2626148 A1 | 8/2013 |

OTHER PUBLICATIONS

European Patent Office, International Search Report and Written Opinion in corresponding International Patent Application No. PCT/US2020/031484 dated Jul. 16, 2020 (9 pages).

* cited by examiner

*Primary Examiner* — Levon J Shahinian
(74) *Attorney, Agent, or Firm* — Leydig, Voit & Mayer, Ltd.

(57) ABSTRACT

A containment tank assembly is described that includes a tank including an inner surface and a cleaning apparatus mounted to the tank. The cleaning apparatus includes an elongate arm and a rotary spray head assembly rotationally coupled to an end of the elongate arm. A rotating nozzle assembly is rotationally coupled to the rotary spray head. A magnetic field source is coupled to the rotary spray head so as to generate a spatially changing magnetic field in accordance with a rotation of the rotary spray head assembly in relation to the end of the elongate arm. A magnet field sensor is carried in a fixed relation to the elongate arm. The magnetic field sensor, in operation, generates a sensor signal that varies in accordance with the spatially changing magnetic field in accordance with the rotation of the rotary spray head assembly.

20 Claims, 11 Drawing Sheets

(51) Int. Cl.
*B05B 12/00* (2018.01)
*B05B 13/06* (2006.01)
*B08B 9/08* (2006.01)
*B08B 9/093* (2006.01)
*G01P 3/487* (2006.01)

(52) U.S. Cl.
CPC ........ *B05B 13/0636* (2013.01); *B08B 9/0813* (2013.01); *B08B 9/0936* (2013.01); *G01P 3/487* (2013.01); *B08B 2209/08* (2013.01)

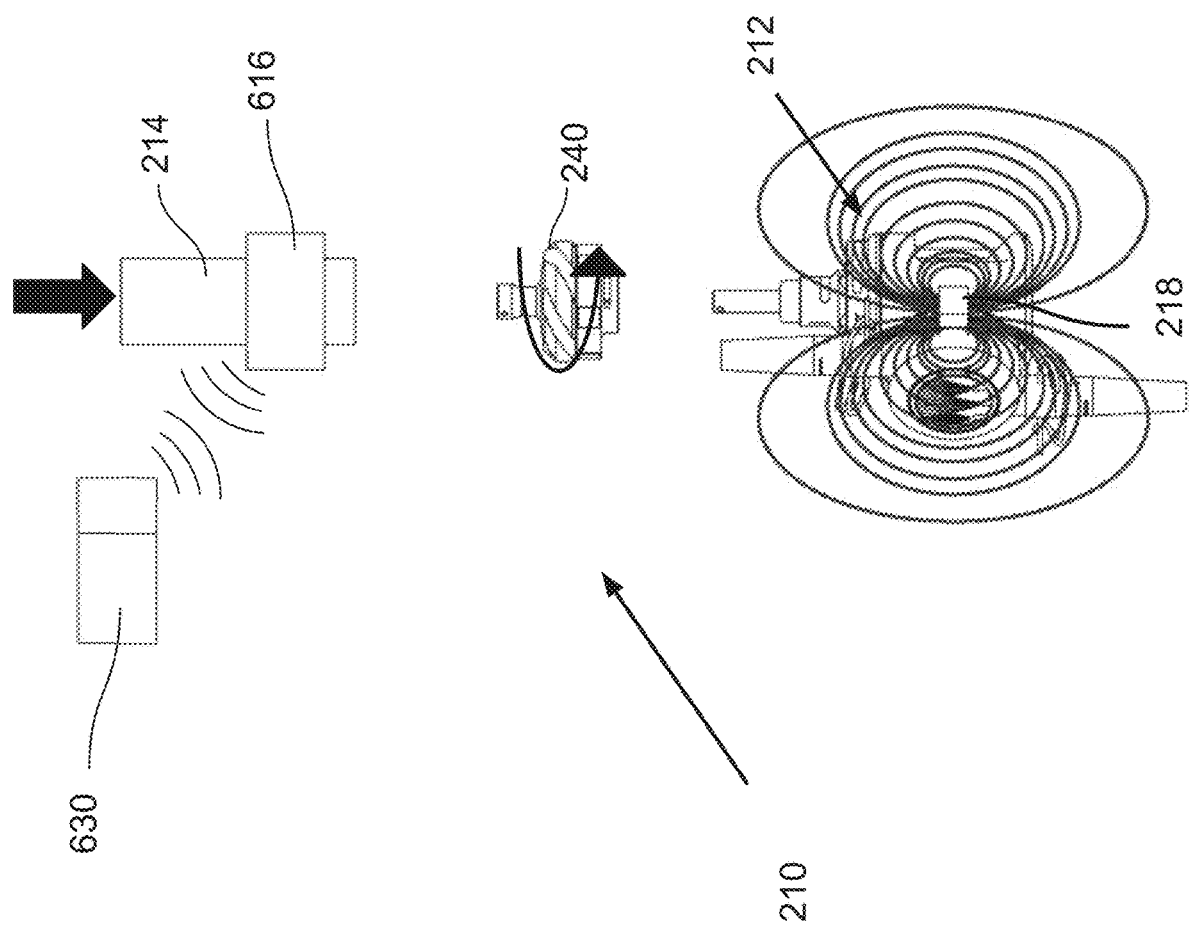

CLEANING APPARATUS INCLUDING A ROTATING SPRAY HEAD ASSEMBLY ROTATION SENSOR

CROSS-REFERENCE TO RELATED APPLICATIONS

This application is a non-provisional of U.S. Provisional Application Ser. No. 62/843,880 filed May 6, 2019, entitled "CLEANING APPARATUS INCLUDING a ROTATING SPRAY HEAD ASSEMBLY ROTATION SENSOR," the contents of which are expressly incorporated herein by reference in their entirety, including any references therein.

TECHNICAL FIELD

The present invention relates generally to internal tank surface (or other visually obstructed surface) cleaning systems and apparatuses, and more particularly to internal surface cleaning systems that include a rotating spray head assembly to which a rotating nozzle assembly is attached, where the rotating nozzle assembly contains one or more spray nozzles. The rotating spray head assembly is disposed at an end of an elongate arm that is inserted into a tank or other enclosure (e.g. a pipe) and arranged to rotate to provide a full spraying coverage of an inside surface of the tank or enclosure.

BACKGROUND

Fluid containment tanks are utilized in a multitude of industrial processes such as food and chemical manufacturing and processing, pharmaceutical manufacturing, wine preparation, material fermentation, and so on. It is often critical to ensure that the interior of the tank is free of unwanted debris and contaminants.

Unwanted contaminants in the tank, or other enclosed area (such as a pipe) may negatively impact the quality of the finished product being processed or manufactured. Moreover, the failure to adequately clean the tank interior can violate regulations relevant to certain industries such as pharmaceutical processing. Thus, it is common to clean the interior of such tanks at certain intervals, e.g., after each process batch, to ensure product quality and adherence to any relevant regulations.

One type of cleaning system employs a tool inserted into a tank. The inserted tool is placed permanently or temporarily within the tank and is typically sealed to the tank via a flange. A rod-like extension of the tool within the tank interior supports a rotary spray head assembly disposed at an innermost end of the rod-like extension. The rod-like extension comprises a tubular housing and the rotary spray head assembly. The rotary spray head assembly comprises a suitable mechanical assembly facilitating at least rotating the rotary spray head assembly, as a whole, along an axis defined by a rotating connection interface between the tubular housing and the rotary spray head assembly.

Additionally, known cleaning systems include a rotary spray head assembly that spins an outlet nozzle assembly along an axis of rotation that is not aligned (e.g. orthogonal) with the axis of rotation of the rotary spray head assembly. Thus, as the rotary spray head assembly rotates, as a whole, about a first rotational axis (defined by the connection of the rotary spray head assembly to the tubular housing), the outlet nozzle assembly discharges a sweeping (precessing) output in accordance with the non-aligned axis of rotation of the outlet nozzle assembly. An example of such multi-axial rotating mechanical assembly is described, for example, in Bramsen, et al., U.S. Pat. No. 9,302,301.

Given the interest in monitoring and control of operation of cleaning systems of the type described above, there is a significant need to provide, without aid of visual observation of the inside of a vessel undergoing cleaning, assurance with a high degree of certainty that the rotary spray head assembly is operating properly.

SUMMARY

Embodiments of the present invention provide an apparatus that includes an elongate arm and a rotary spray head assembly rotationally coupled to an end of the elongate arm. A rotating nozzle assembly is rotationally coupled to the rotary spray head. A magnetic field source is coupled to the rotary spray head so as to generate a spatially changing magnetic field in accordance with a rotation of the rotary spray head assembly in relation to the end of the elongate arm. A magnet field sensor is carried in a fixed relation to the elongate arm. The magnetic field sensor, in operation, generates a sensor signal that varies in accordance with the spatially changing magnetic field in accordance with the rotation of the rotary spray head assembly.

Embodiments of the present invention provide a containment tank assembly that includes a tank including an inner surface and a cleaning apparatus mounted to the tank. The cleaning apparatus includes an elongate arm and a rotary spray head assembly rotationally coupled to an end of the elongate arm. A rotating nozzle assembly is rotationally coupled to the rotary spray head. A magnetic field source is coupled to the rotary spray head so as to generate a spatially changing magnetic field in accordance with a rotation of the rotary spray head assembly in relation to the end of the elongate arm. A magnet field sensor is carried in a fixed relation to the elongate arm. The magnetic field sensor, in operation, generates a sensor signal that varies in accordance with the spatially changing magnetic field in accordance with the rotation of the rotary spray head assembly.

BRIEF DESCRIPTION OF DRAWINGS

FIG. 11 is an enlarged perspective drawing of a wireless communication link alternative to the wired connection between a magnetic field sensor and an electronic processor in a fluid-driven cleaning apparatus of the type depicted in FIG. 6.

Figure 1:
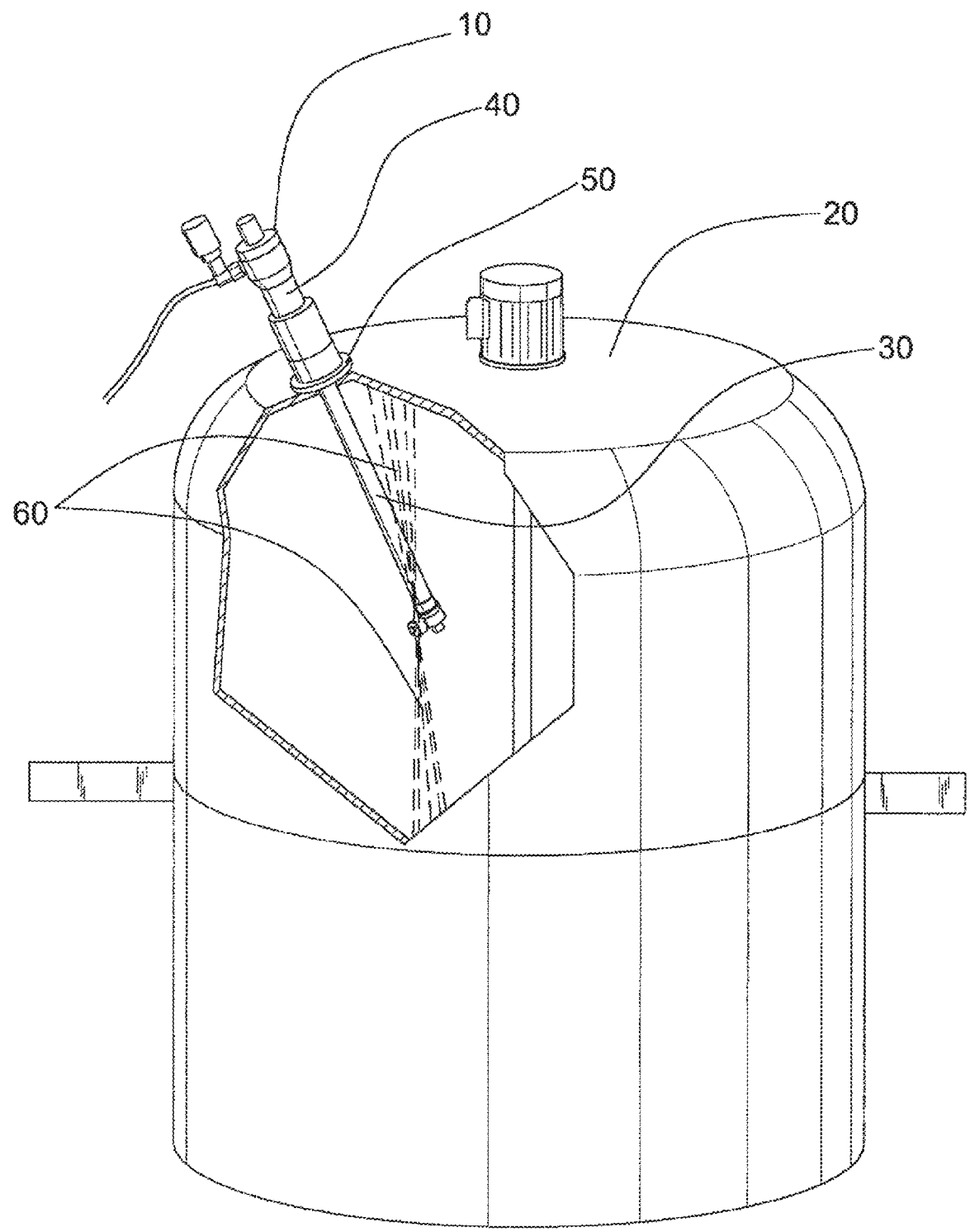
FIG. 1 is a cut away perspective depiction of an illustrative containment tank comprising a cleaning apparatus usable in accordance with embodiments of the disclosure.

While the invention is susceptible of various modifications and alternative constructions, certain illustrative embodiments thereof have been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DESCRIPTION OF EMBODIMENTS

Illustrative examples of an apparatus are now described that address a need to ensure at least the rotating head spray head assembly is operating properly in a visually obstructed environment (e.g. a tank, a pipe, etc.). The illustrative examples utilize a magnetic field sensor and a magnet field source to continuously measure and provide a rotational position and rate for a rotary spray head assembly disposed at a distal end of an elongate arm inserted into a visually obstructed environment of, for example, a tank or pipe. The rotary spray head assembly is rotationally coupled to an end of the elongate arm to facilitate rotating the rotary spray head assembly on an axis of rotation defined by the rotational coupling between the rotary spray head assembly and the elongate arm. More particularly, a magnetic field sensor is carried on a non-rotating part of the elongate arm at a position suitable for receiving and sensing a cyclical varying (sensed) magnetic field arising from the magnetic field source carried by the rotary head assembly—either directly (per FIG. 2) or indirectly (per FIGS. 7-9). By way of example, the magnetic field sensor is a Hall Effect sensor and the magnetic field source is a permanent magnet. Further details of illustrative examples are described with reference to the drawings. The Hall Effect sensor is oriented with respect to the permanent magnet such that the resulting sensor signal varies in a predictable manner as the magnet precesses about the axis of rotation of the rotary spray head assembly. Thus, a sensed magnet field signal provided by the Hall Effect sensor enables monitoring, without visual observation, an instantaneous position and a current rotation rate of the rotary spray head assembly in relation to the Hall Effect sensor mounted on the elongate arm (which is fixed in position on the elongate arm and does not rotate).

Referring to FIG. 1, an illustrative cleaning apparatus 10 which has particular utility in cleaning an interior surface of a tank 20. The cleaning apparatus 10 comprises an elongate tubular portion 30 that extends into the tank 20 and an actuating portion 40 situated outside of the tank 20. In other embodiments, the actuating portion 40 is situated inside the tank 20. An interior surface of the tank 20 is sealed from an external environment via an annular seal 50 at which the elongate tubular portion 30 of the cleaning apparatus 10 enters the tank 20.

During a cleaning process, the cleaning apparatus 10 projects a cleaning fluid in one or more streams numbered as 60 against the interior surface of the tank 20. While projecting the streams 60 against the walls of the tank 20, the cleaning apparatus 10 progressively varies a location of impingement of the streams 60 on the interior surface of the tank 20 so as to eventually treat (clean, rinse, coat, etc.) substantially the entire interior surface of the tank 20.

The manner in which the point(s) of impingement on the interior surface of the tank 20 are controlled is carried out in any of a vast spectrum of control schemes.

Figure 2:
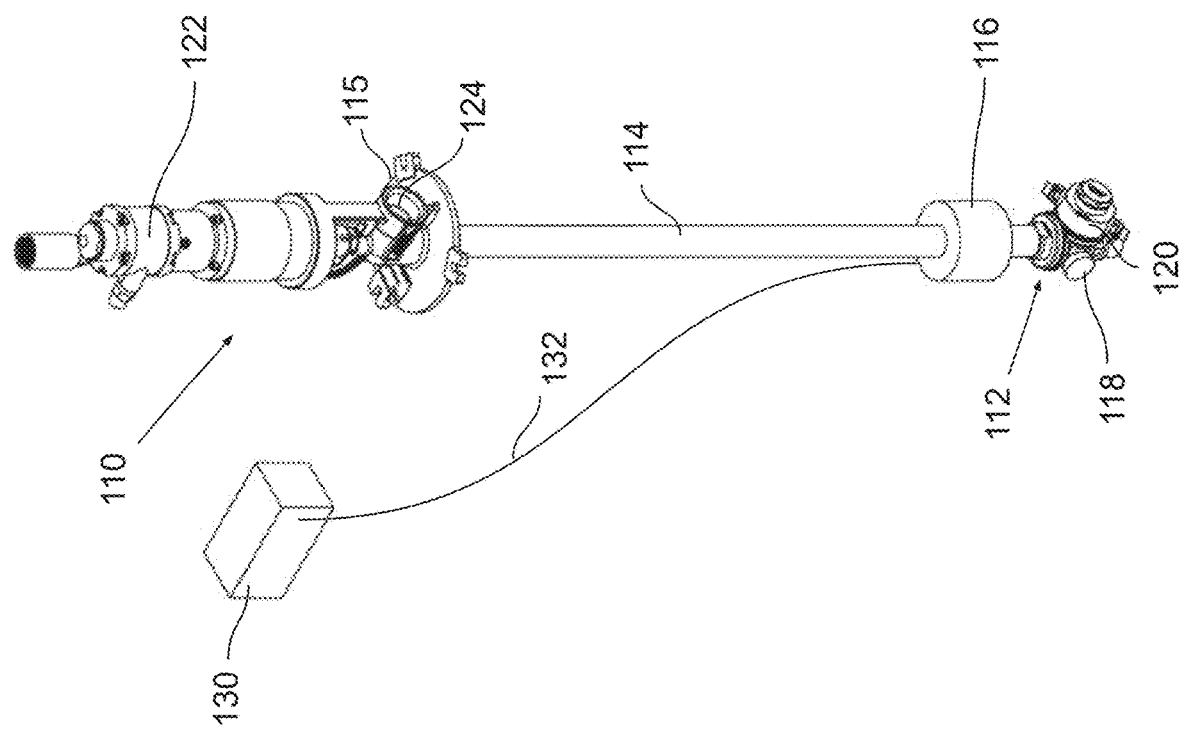
FIG. 2 is an enlarged perspective drawing of the cleaning apparatus of the system illustrated in FIG. 1.

Turning to FIG. 2, a detailed drawing is provided of a cleaning apparatus 110 (e.g. a tank cleaning apparatus) incorporating a magnetic field-based rotation sensing assembly for a rotary spray head assembly 112 rotationally coupled to a supply housing 114 (elongate arm) that facilitates monitoring, without visual confirmation, a position and rotation rate of the rotary spray head assembly 112. In the illustrative example, a magnetic field sensor 116 (e.g. Hall Effect sensor) is carried, in a fixed relation, on the supply housing 114. The supply housing 114 is held in a fixed position with respect to a tank (not shown) by a flange 115. A magnetic field source (magnet) 118 is carried, in a fixed relation, on the rotary spray head assembly 112. While the magnet 118 is depicted as being mounted on an outside surface of the rotary spray head assembly 112 in the illustrative example of FIG. 2, the physical positioning can be modified in various alternative physical configurations— including embedding the magnetic field source (magnet) within a casing of the rotary spray head assembly 112. Moreover, the orientation of the magnetic field poles need not be in any particular direction to facilitate detection of rotation of the rotary spray head assembly 112 by the magnetic field sensor 116.

The rotary spray head assembly 112, rotationally coupled to the supply housing, rotates along an axis of rotation in an aligned relation to the supply housing 114. However, in alternative embodiments, the axis of rotation of the rotary spray head assembly 112 is not aligned with the supply housing 114. Moreover, while the supply housing 114 is generally a straight rod, in alternative embodiments, the supply housing 114 is a non-straight (even flexible) structure.

As noted, in the illustrative example depicted in FIG. 2, an axis of rotation of the rotary spray head assembly 112 aligns with an axis of the supply housing 114. Additionally, a rotating nozzle assembly 120, rotationally coupled to the rotary spray head assembly 112, comprises a pair of nozzles. The rotating nozzle assembly 120 rotates along a precessing axis of rotation that remains substantially perpendicular (or any other non-aligned axis) to the axis of rotation of rotation of the rotary spray housing. The rotating nozzle assembly 120 is, by way of example, coupled by a geared (e.g. interlocking teeth) physical interface with the rotary spray head assembly 112 such that the nozzle assembly 120 and spray head assembly 112 rotate simultaneously in a fixed ratio established by the geared interface.

With continued reference to FIG. 2, a motor-driven shaft arrangement is depicted. In such arrangement, a motor 122 drives a shaft (not shown) within the supply housing 114 that, in turn, rotates the rotary spray head assembly 112 in relation to the supply housing 114. The motor 122 may be, for example, fluid or electrically actuated to impart a rotation on the shaft. In an alternative "shaftless" example (see e.g., FIG. 6) rotation of the rotary spray head assembly 112 is affected by fluid (e.g. cleaning fluid) flow through the supply housing 114 (214) to a turbine located proximate and coupled to the rotary spray head assembly 112 (212) to drive rotation thereof.

Additionally, a supply inlet 124 provides an opening to a channel within the supply housing 114 that carries a treating fluid for emission via the outlets of the rotating nozzle assembly 120.

In an illustrative example, an electronic processor 130 contains a combination of electronic control logic and analog circuitry for monitoring and control of the cleaning apparatus 110. The control aspects of the electronic processor 130 are not of particular emphasis in the present disclosure and will not be discussed in detail. Instead, the description of the electronic processor 130 will focus upon the monitoring of a rotational position/rate of the rotary spray head assembly 116.

In the illustrative example of FIG. 2, the magnetic field sensor 116 is a Hall Effect sensor that requires a current source. In the illustrative example, a set of current source lines 132 also operate as a sensed magnetic field signal source. In the illustrative example, the electronic processor 130 monitors a signal value (e.g. voltage difference, current) on the set of current source lines 132 and determines a rotation position, rotation rate, or other operational status by applying the signal value to a mapping of sensed signal values and corresponding rotational positions of the rotary spray head assembly 112.

Figure 3:
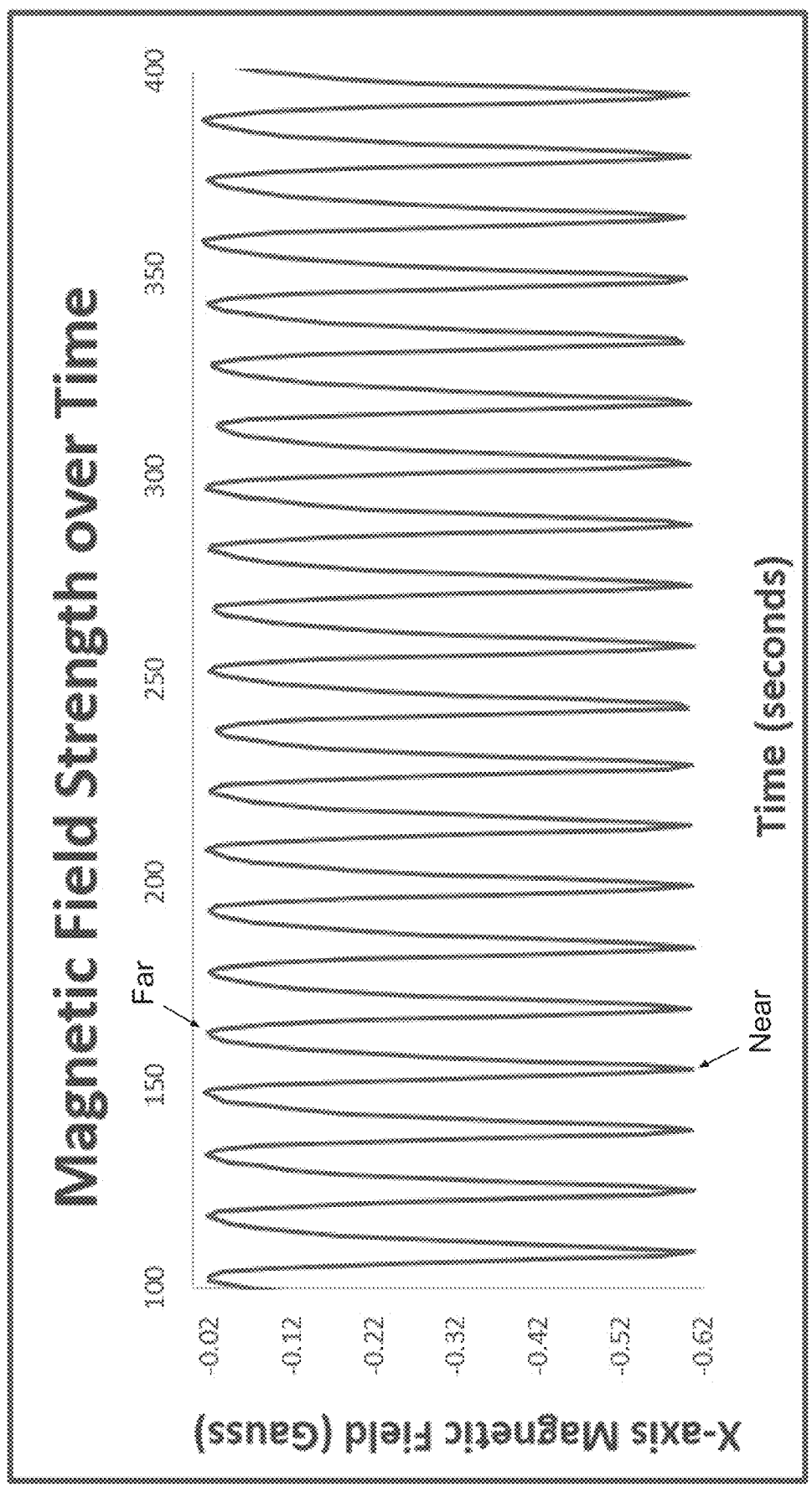
FIG. 3 is an illustrative sensor output waveform in accordance with the illustrative example depicted in FIG. 2.

In other embodiments, the electronic processor 130 senses/counts instances of particular values (or parts, such as peaks or valleys) of a received analog signal waveform (in association with a timer/timestamp function) to render a rotation period value. The electronic processor may record an individual rotation time period, or alternatively render an average rotation time based upon measurement of multiple rotation periods. An exemplary waveform is provided in FIG. 3 for several rotations at a rate of approximately one rotation every 15 seconds. In the illustrative waveform, the signal minimum is achieved when the magnetic field (Hall Effect) sensor 116 is sensing a maximum magnetic field from the magnet 118. Conversely, the signal maximum is achieved when the magnetic field sensor 116 is sensing a minimum magnetic field. The waveform is repeating and consistent across all rotation periods. Thus, a relatively simple mapping can be made between an observed sensor signal value on the lines 132 and a rotational position of the rotary spray head assembly 112.

Figure 4:
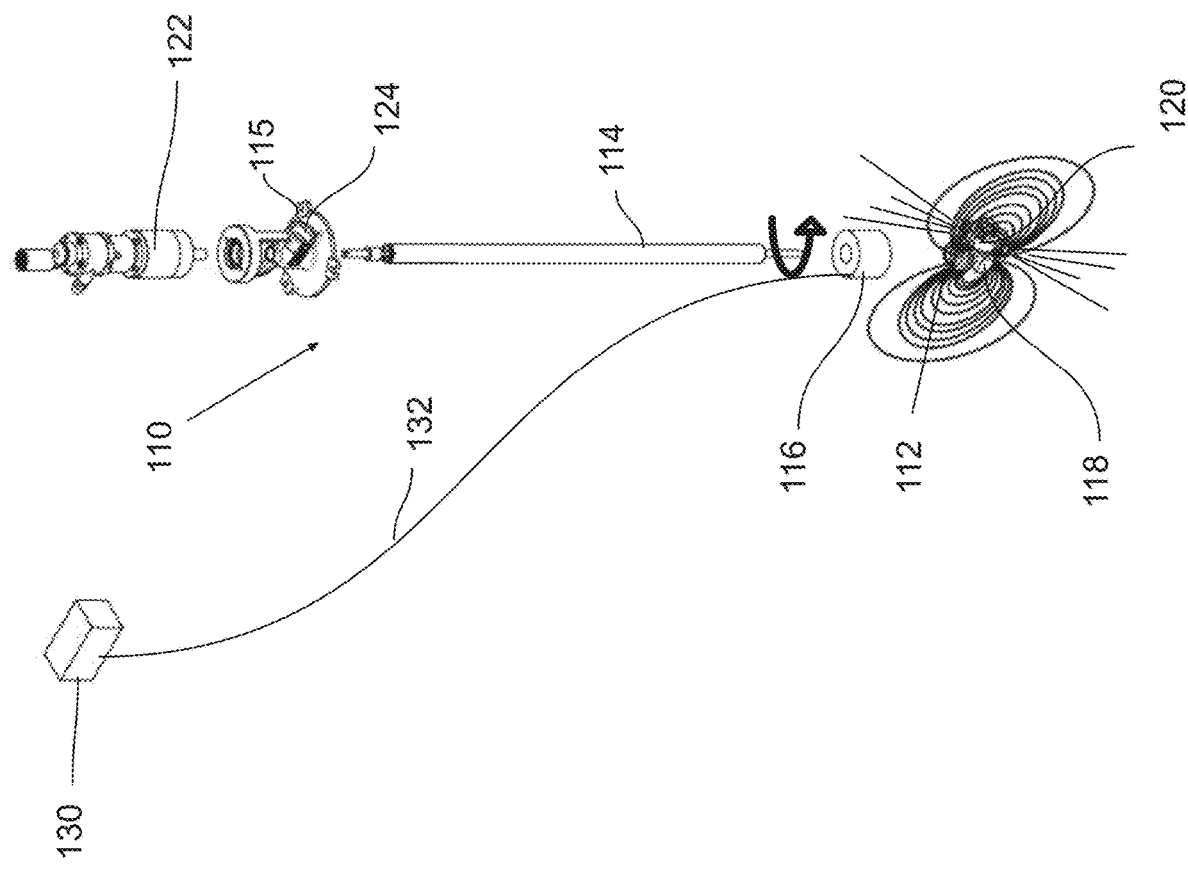
FIG. 4 is a blown up view of the cleaning apparatus depicted in FIG. 2.

FIG. 4 provides an exploded view of the cleaning apparatus 110 depicted in FIG. 2 showing individual pieces of the illustrative example depicted therein.

Figure 5:
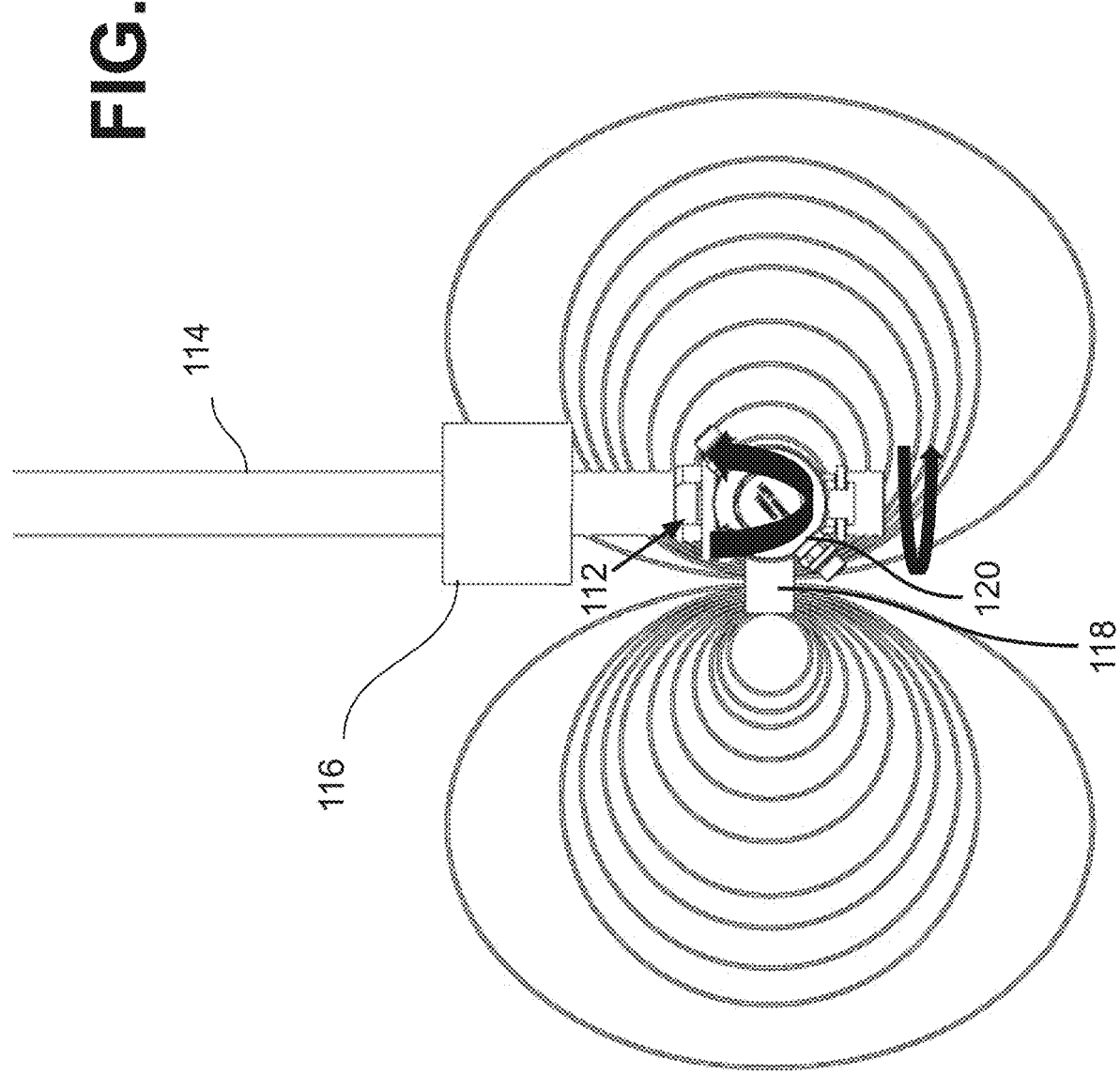
FIG. 5 is a zoomed-in view of an end portion of the cleaning apparatus depicted in FIG. 2.

Turning briefly to FIG. 5, an expanded view of a lower portion of the cleaning apparatus 110 is provided. In this alternative view, flux lines are depicted in the two dimensional view. It will be appreciated by those skilled in the art that the flux lines begin and end at the poles of the magnet 118 and extend in three-dimensional space. Similarly, the magnetic field sensor 116 operates upon the flux (lines) passing through a sensor element in accordance with well-known principles of Hall Effect sensor operation.

In the illustrative example, a Hall Effect sensor was selected for use since the rotation rate (15 seconds per rotation) was relatively slow. However, in higher rotation rate applications (e.g. on the order of 100 rotations per second), an inductive sensor arrangement could be used. The illustrative example of a Hall Effect sensor for sensing the magnetic field is not intended to be limiting with regard to suitable alternatives.

Figure 6:
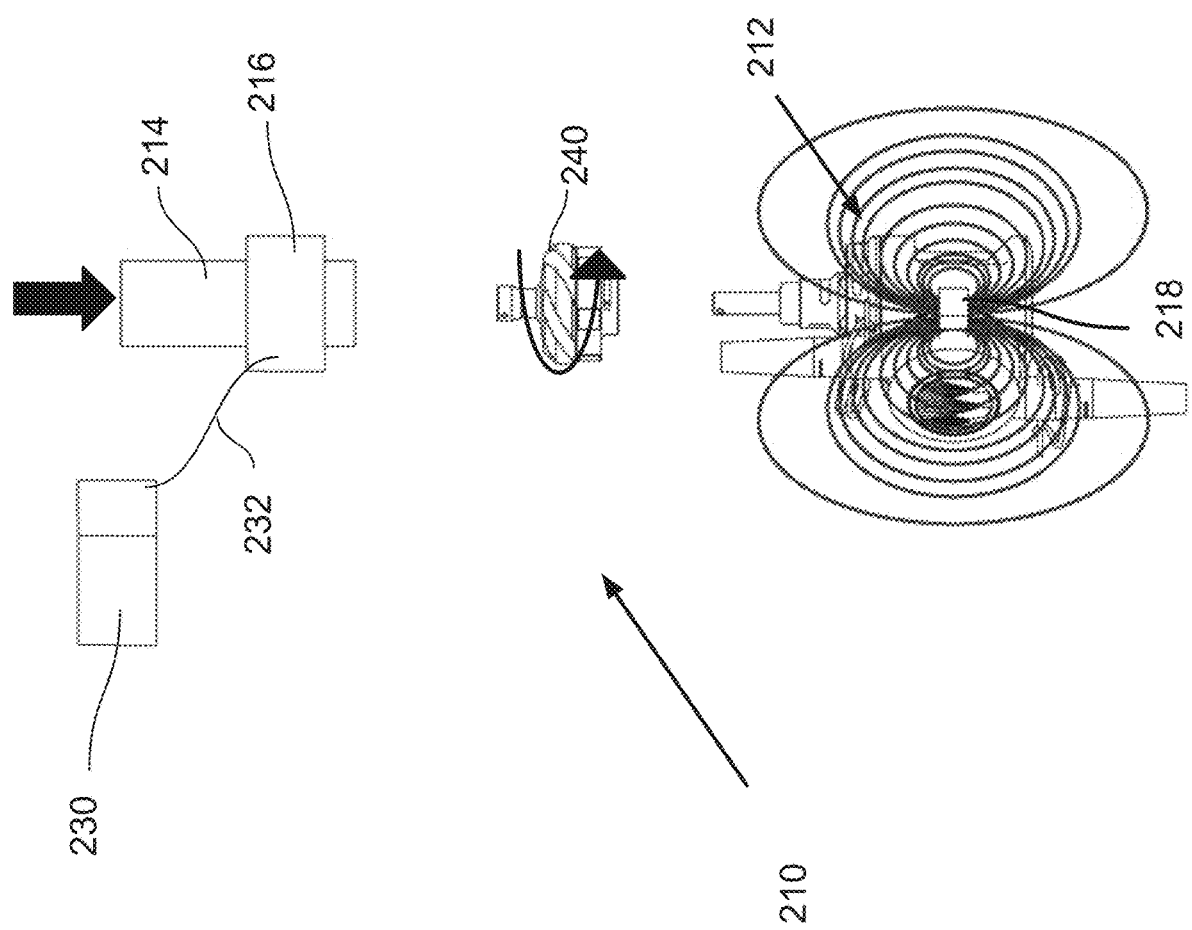
FIG. 6 is a partial blown up view of a fluid-driven version of an end portion the cleaning apparatus depicted in FIG. 2.

Turning to FIG. 6, an exploded view is provided of a portion of a motorless-shaftless alternative embodiment to the cleaning apparatus 110 depicted in FIG. 2. In the embodiment depicted in FIG. 6, a cleaning apparatus 210 incorporates a fluid-driven turbine 240. Instead of a shaft, a pressurized fluid (e.g. cleaning fluid) flows through a supply housing 214 to impart rotation on the turbine 240. The turbine 240, in turn, imparts a rotation on a rotary spray head assembly 212. A magnetic field sensor 216 and a magnet 218 are positioned in a same general manner as depicted in FIG. 2. A wired connection is provided by lines 232 between the magnetic field sensor 216 and an electronic processor 230 that are described above with reference to similarly number elements of FIG. 2.

Figure 7:
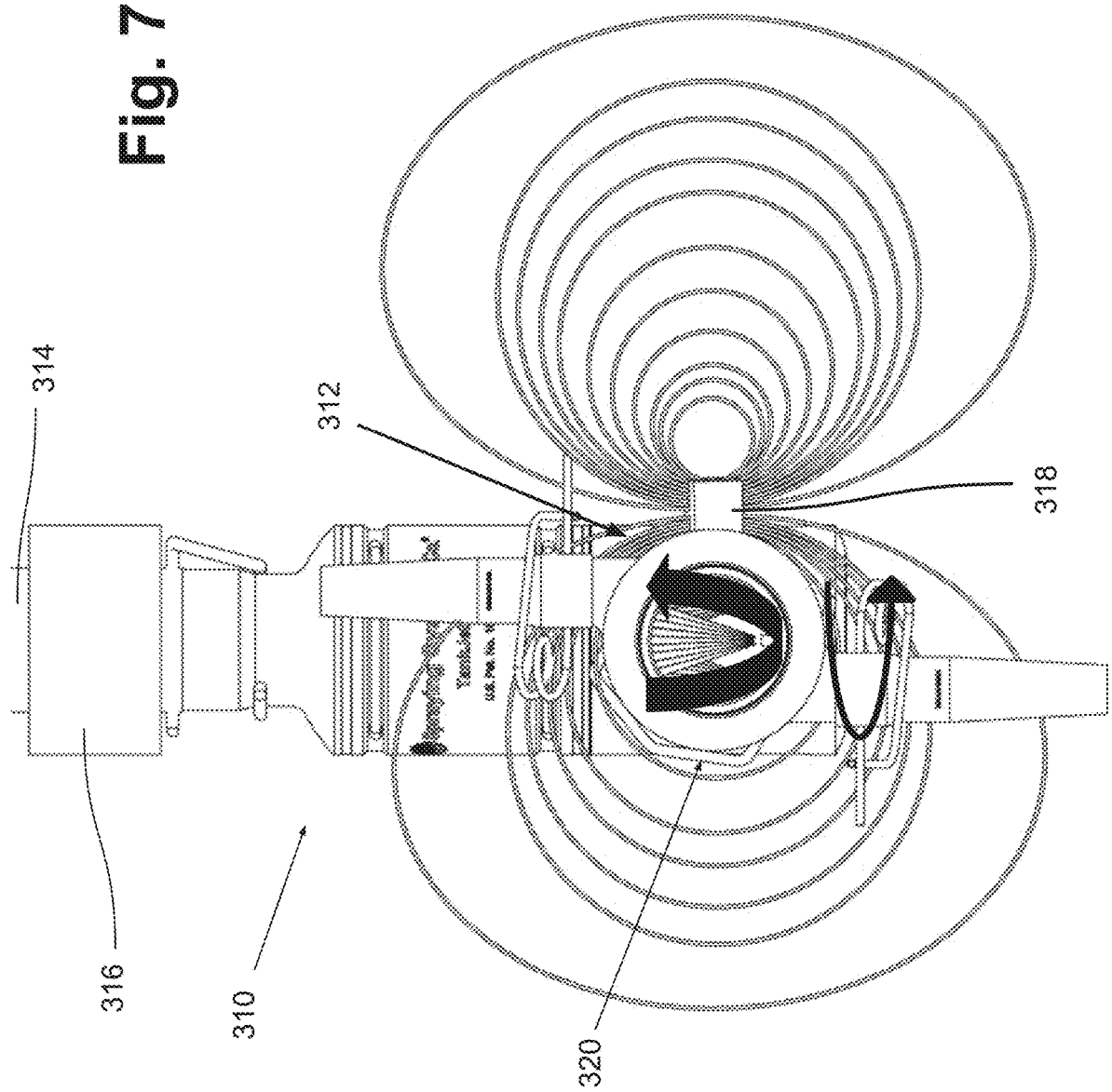
FIG. 7 is a partial view of an end portion the cleaning apparatus depicted in FIG. 2 depicting a first alternative positioning of a magnet field source.
Figure 8:
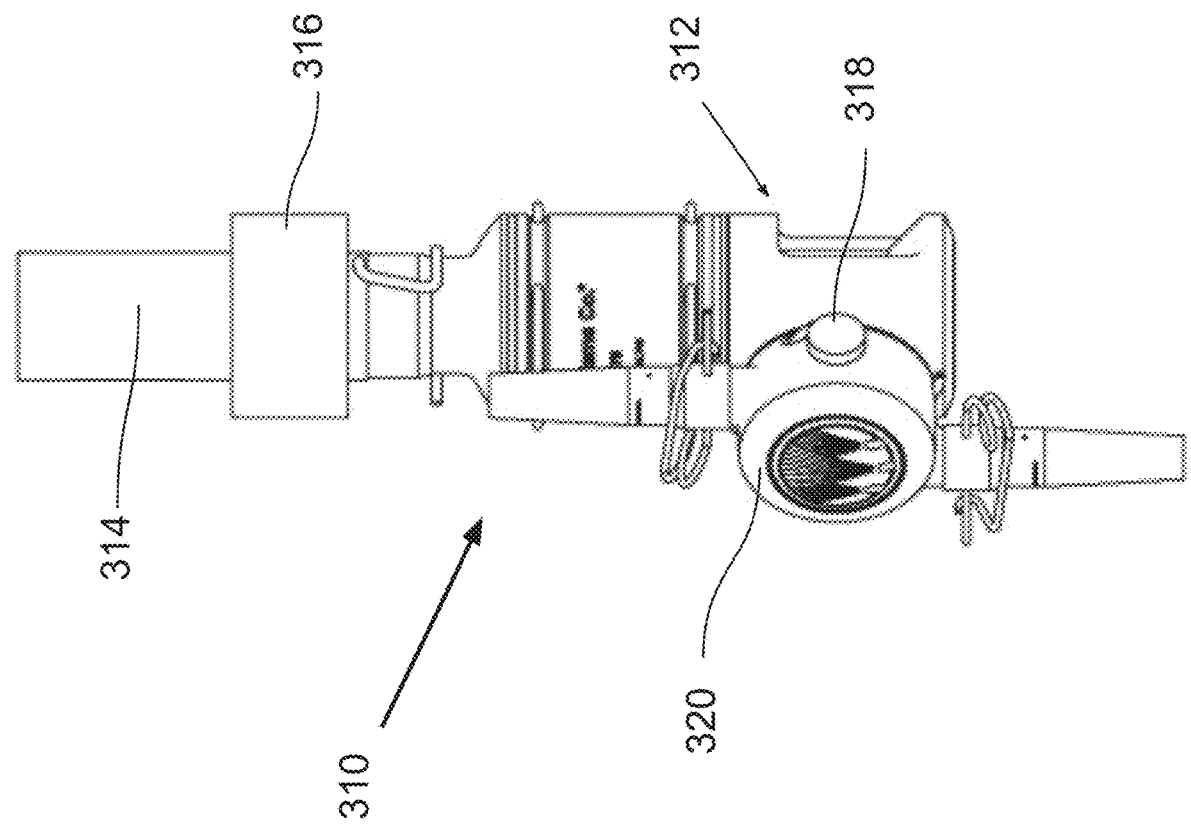
FIG. 8 is a second partial view, from a second perspective, of the end portion the cleaning apparatus depicted in FIG. 7.

Turning to FIG. 7, an alternative physical positioning is provided for a magnet field source (magnet) of the magnet 218 and magnetic field sensor 216 physical/inductive pairing previously described with reference to FIG. 2. A magnetic field sensor 316 is carried on a supply housing 314. Notably, in a cleaning apparatus 310, a magnet 318 is mounted upon a rotating nozzle assembly 320 rotationally coupled to a rotary spray head assembly 312. The resulting path and reorientation of the poles of the magnet 318 in a three-dimensional space as the rotary spray head assembly 312 and the rotating nozzle assembly 320 simultaneously rotate produces a complex, yet predictable waveform in the resulting signals provided by the magnetic field. FIG. 8 provides an alternative view, with the rotary head assembly 312 rotated approximately one eighth of a turn from the position depicted in FIG. 7. This view is intended to provide a clearer view of the positioning of the magnet 318 on the rotating nozzle assembly 320.

Figure 9:
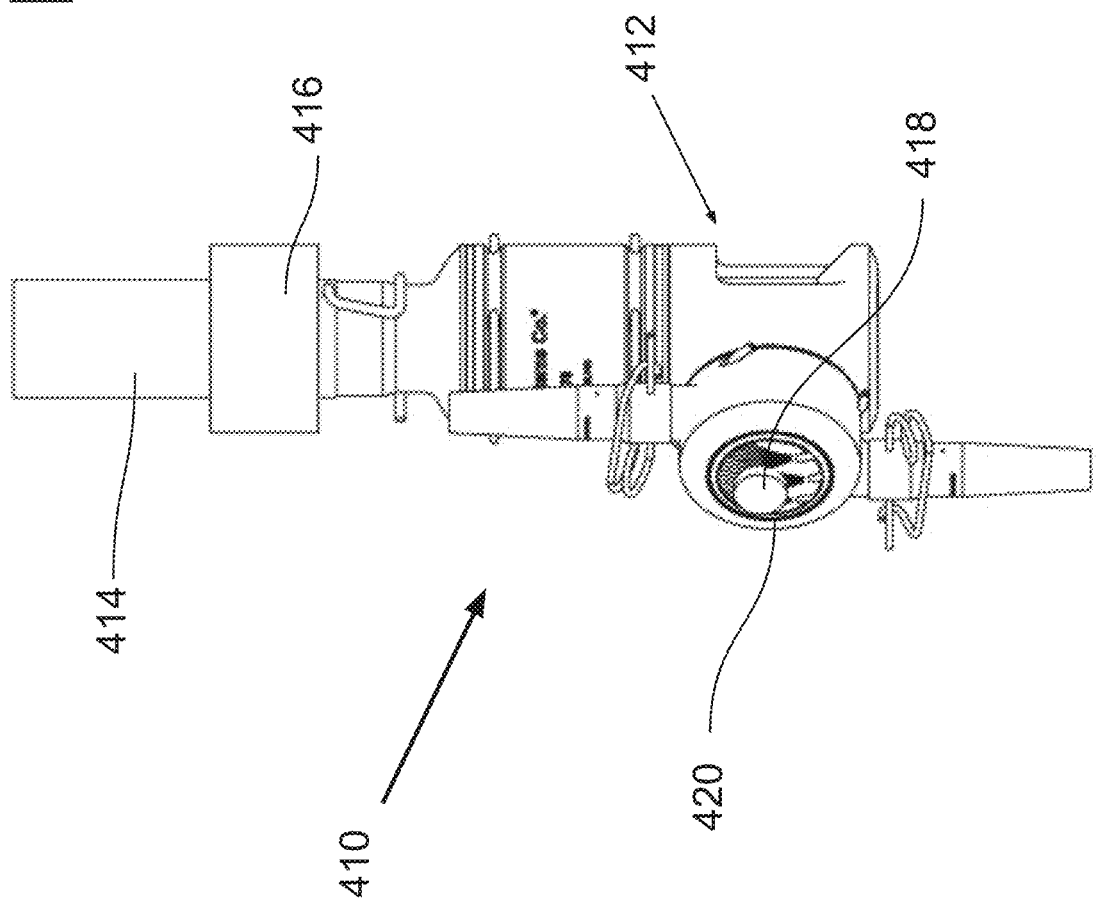
FIG. 9 is a partial view of an end portion the cleaning apparatus depicted in FIG. 2 depicting a second alternative positioning of a magnet field source.

Turning to FIG. 9, yet another illustrative alternative configuration of magnetic source positioning is shown. In the illustrative example, a cleaning apparatus 410 is depicted wherein a magnet 418 is fixed to a rotating (spinning) surface of a rotating nozzle assembly 420 such that an axis of rotation of the magnetic north/south poles of the magnet 418 is aligned with an axis of rotation of the rotating nozzle assembly 420. The illustrative example in FIG. 9 results in a magnetic field source/sensor relationship where a magnetic field sensor 416 on a housing 414 senses an alternating N/S polarity field from the magnet 418 as the rotating nozzle assembly 420 rotates according to a geared relationship between the rotating nozzle assembly 420 and a rotary head assembly 412.

Figure 10:
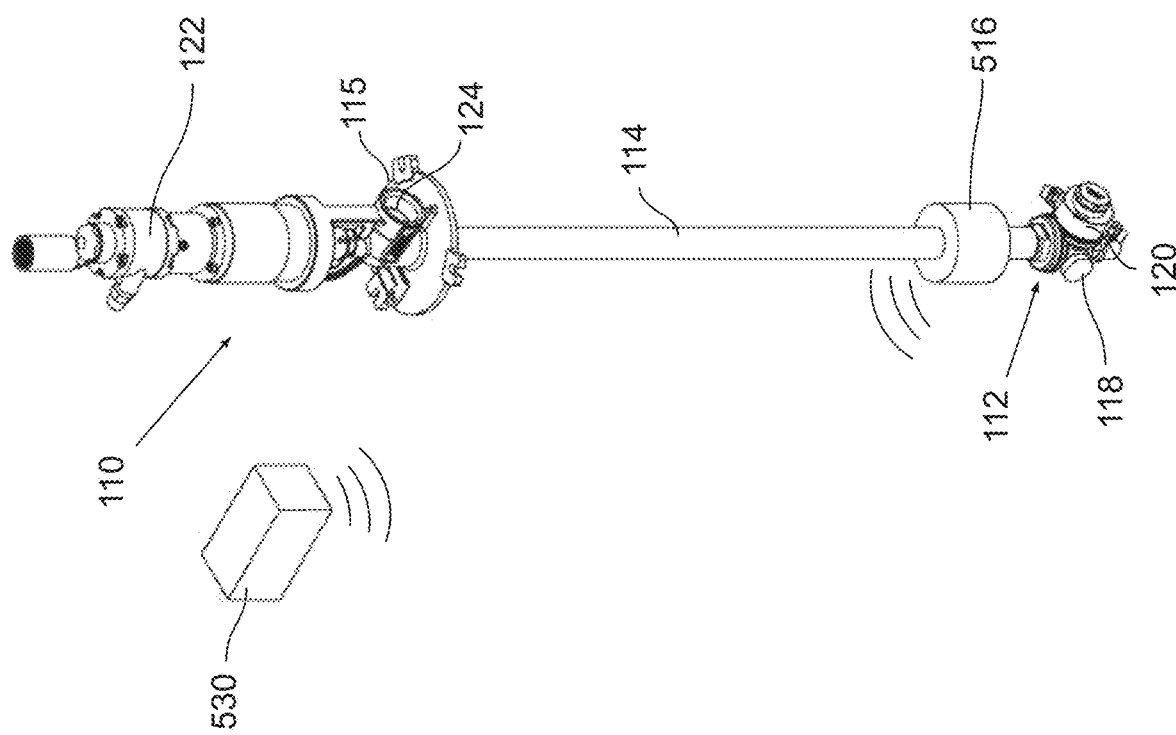
FIG. 10 is an enlarged perspective drawing of a wireless communication link alternative to the wired connection between a magnetic field sensor and an electronic processor depicted in FIG. 2.

Briefly turning to FIG. 10, a wireless embodiment is disclosed. In the illustrative example, an electronic processor 530 communicates using an appropriate wireless communications protocol to receive signal data provided by a wireless transmitter incorporated into a magnetic field sensor 516. Additionally, the magnetic field sensor 516 includes an independent power source to drive the sensor circuitry and communications interface for receiving commands from and transmitting signal/rotational status data to the electronic processor 530. In the illustrative example provided in FIG. 10, rotation of the rotary head assembly 112 is driven by the motor 122 via a shaft within the supply housing 114. However, as shown in FIG. 11, a turbine 340 may be used in an alternative wireless arrangement where an electronic processor 630 and a magnetic field sensor 616 communicate wirelessly, and the magnetic field sensor 616 is independently powered (i.e. without receiving power from the electronic processor 630).

Although the accompanying discussion has referred to generally to the cleaning of closed tanks and enclosures, it will be appreciated that the invention is not so limited. Alternative configurations of the cleaning apparatus include: linear actuated nozzles, retractable lances, tube and pipe cleaning units, sewers, etc.—anywhere a rotating end piece that carries one or more spray nozzles is not visible during a cleaning operation. One or more of the described embodiments may be useful when seeking validation of functional operation.

While the illustrative examples described herein above and depicted in the drawings include a single magnet. The present disclosure contemplates providing multiple magnetic field sources. For example, referring to FIG. 2, the rotary spray head assembly 112 may carry multiple instances of the magnet 118, where each instance of the magnet 118 is spaced at a known rotational angle from other instances of the magnet 118. For example, the rotary spray head assembly 112 may be configured to carry two (2) instances of the magnet 118 to produce two (2) magnetic field fluctuations that are sensed by the magnet field sensor 116 per rotary spray head assembly 112 rotation. Thus, in a case where the rotary spray head assembly 112 is tuned/configured to operate at one rotation every 4 seconds (15 RPM), a total of 30 fluctuations are sensed by the magnetic field sensor 116 per minute (0.5 Hz). While a single magnetic field fluctuation per rotation will suffice, multiple fluctuations per rotation may improve rotation anomaly detection and detection accuracy (by increasing the rate of producing detection events during operation of the rotary spray head assembly 112) for relatively long rotation periods. For example, sufficient fluctuation-producing features are incorporated into the rotary spray head assembly 112 so as to produce (in the illustrative example with 15 RPM and 2 magnets) a fluctuation every 2 seconds.

It will be appreciated that the foregoing description relates to examples that illustrate a preferred configuration of the cleaning system. However, it is contemplated that other implementations of the invention may differ in detail from foregoing examples. As noted earlier, all references to the invention are intended to reference the particular example of the invention being discussed at that point and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An apparatus comprising:
   an elongate arm;
   a rotary spray head assembly rotationally coupled to an end of the elongate arm;
   a rotating nozzle assembly rotationally coupled to the rotary spray head assembly;
   a magnetic field source coupled to the rotary spray head so as to generate a spatially changing magnetic field in accordance with a rotation of the rotary spray head assembly in relation to the end of the elongate arm; and
   a magnet field sensor carried at the end of the elongate arm to which the rotary spray head assembly is rotationally coupled,
   wherein the magnetic field sensor, in operation, generates a sensor signal that varies in accordance with the spatially changing magnetic field in accordance with the rotation of the rotary spray head assembly, and
   wherein the rotary spray head assembly provides an interconnecting structure between the elongate arm and the rotating nozzle assembly.

2. The apparatus of claim 1 further comprising an electronic processor communicatively coupled to a communication interface that facilitates the electronic processor receiving the sensor signal generated by the magnetic field sensor in accordance with the spatially changing magnetic field.

3. The apparatus of claim 1 wherein the spatially changing magnetic field is a periodically repeating magnetic field having a period corresponding to a rotation period of the rotary spray head assembly.

4. The apparatus of claim 1 wherein the magnetic field sensor is a Hall Effect sensor.

5. The apparatus of claim 1 wherein rotation of the rotary spray head assembly is affected by fluid pressure.

6. The apparatus of claim 1 wherein rotation of the rotary spray head assembly is affected by a mechanical shaft output of a motor.

7. The apparatus of claim 1 wherein the magnetic field source is mounted on an outside surface of a body of the rotary spray head assembly.

8. The apparatus of claim 1 wherein the magnetic field source is embedded within an outside surface of a body of the rotary spray head assembly.

9. The apparatus of claim 1 wherein the magnetic field source comprises at least a first magnetic field source carried by the rotary spray head assembly.

10. The apparatus of claim 9 wherein the magnetic field source comprises at least a second magnetic field source carried by the rotary spray head assembly.

11. A containment tank assembly comprising:
    a tank including an inner surface; and
    a cleaning apparatus mounted to the tank, wherein the cleaning apparatus comprises:
    an elongate arm;
    a rotary spray head assembly rotationally coupled to an end of the elongate arm;
    a rotating nozzle assembly rotationally coupled to the rotary spray head assembly;
    a magnetic field source coupled to the rotary spray head so as to generate a spatially changing magnetic field in accordance with a rotation of the rotary spray head assembly in relation to the end of the elongate arm; and
    a magnet field sensor carried at the end of the elongate arm to which the rotary spray head assembly is rotationally coupled,
    wherein the magnetic field sensor, in operation, generates a sensor signal that varies in accordance with the spatially changing magnetic field in accordance with rotation of the rotary spray head assembly, and wherein the rotary spray head assembly provides an interconnecting structure between the elongate arm and the rotating nozzle assembly.

12. The containment tank of claim 11 further comprising an electronic processor communicatively coupled to a communication interface that facilitates the electronic processor receiving the sensor signal generated by the magnetic field sensor in accordance with the spatially changing magnetic field.

13. The containment tank of claim 11 wherein the spatially changing magnetic field is a periodically repeating magnetic field having a period corresponding to a rotation period of the rotary spray head assembly.

14. The containment tank of claim 11 wherein the magnetic field sensor is a Hall Effect sensor.

15. The containment tank of claim 11 wherein rotation of the rotary spray head assembly is affected by fluid pressure.

16. The containment tank of claim 11 wherein rotation of the rotary spray head assembly is affected by a mechanical shaft output of a motor.

17. The containment tank of claim 11 wherein the magnetic field source is mounted on an outside surface of a body of the rotary spray head assembly.

18. The containment tank of claim 11 wherein the magnetic field source is embedded within an outside surface of a body of the rotary spray head assembly.

19. The containment tank of claim 11 wherein the magnetic field source comprises at least a first magnetic field source carried by the rotary spray head assembly.

20. The containment tank of claim 19 wherein the magnetic field source comprises at least a second magnetic field source carried by the rotary spray head assembly.

* * * * *